UNITED STATES PATENT OFFICE.

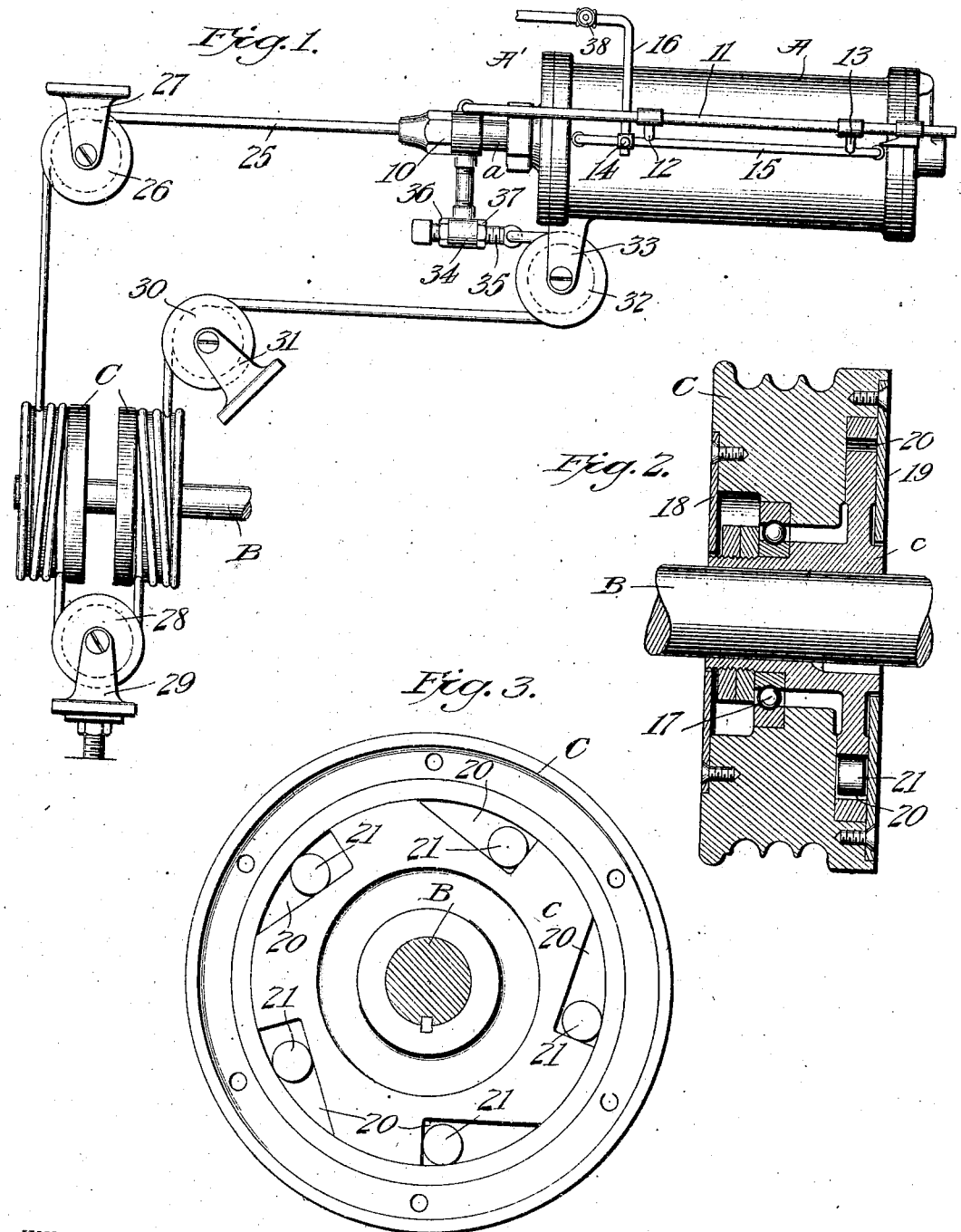

GEORGE HARTWELL KELLEY, OF GAINESVILLE, FLORIDA, ASSIGNOR TO THE KELLEY SELF-STARTER COMPANY, OF GAINESVILLE, FLORIDA, A CORPORATION OF FLORIDA.

STARTER FOR EXPLOSIVE-ENGINES.

1,073,139.  Specification of Letters Patent.  Patented Sept. 16, 1913.

Application filed August 17, 1912. Serial No. 715,668.

*To all whom it may concern:*

Be it known that I, GEORGE HARTWELL KELLEY, a citizen of the United States, residing at Gainesville, Alachua county, and State of Florida, have invented and discovered certain new and useful Improvements in Starters for Explosive-Engines, of which the following is a specification.

My said invention consists in certain improvements in the details of construction and arrangement of parts of starters for explosive engines, particularly of that class operated by an auxiliary engine, such as is shown in my Patent No. 1,035,091, of August 6, 1912, my present invention consisting in certain improvements in the mechanism therein shown whereby certain advantages are secured, all as will be hereinafter more fully described and claimed.

Referring to the accompanying drawings which are made a part hereof and on which similar reference characters indicate similar parts, Figure 1 is a top or plan view of the auxiliary engine, in this case a compressed air cylinder, and the other parts to which my invention particularly relates, Fig. 2 a central sectional view through one of the clutches, and Fig. 3 a side elevation with one of the side plates removed showing the interior form of the clutch.

In said drawings the portions marked A represent the auxiliary engine or compressed air cylinder, B the main engine shaft, and C a pair of clutches mounted on said engine shaft.

The compressed air cylinder A is of a common or any approved construction provided with a piston (not shown) from which a piston rod *a* extends through a stuffing-box in the piston head A¹. On the end of said piston rod is mounted a head 10 to which is connected a sliding rod 11, having strikes 12 and 13, positioned to operate a valve 14 in the compressed air supply pipe 15, as shown and more fully described in my patent above referred to. The pipe 15 connects the inlet and exhaust ports of the cylinder, or engine, and is connected with a compressed air supply, or air pump, by a pipe 16, as will be readily understood.

The clutches C are of duplicate construction comprising spools mounted upon appropriately formed centers *c* which are keyed to the engine shaft B. Said spools are preferably mounted on said centers by ball bearings 17, mounted to operate in appropriate ball races as is usual. The spool C projects over the edges of the center *c* and is provided with side plates 18 and 19 respectively adapted to cover the ends of the center and inclose the clutch mechanism and protect the same from the dust and dirt. Said centers *c* are formed with a series of pockets 20 in their respective peripheries one side of which is radial and the other side of which is tangential, as best illustrated in Fig. 3. Rollers or disks 21 are mounted in said pockets and are of a size adapted to just clear the inner adjacent face of the spool C when said rollers rest against the radial side of said sockets, while they are adapted to impinge against said inner surface and lock the spool to said center as soon as they move any appreciable distance away from the radial side of said sockets. Thus when the spool rotates in a direction toward said radial sides the rollers will roll to that end of said pockets and leave the spool to rotate free on the center but as soon as said spool starts in the opposite direction said rollers will roll down the tangential side of the pockets and lock the spool to the center, which will be then rotated with said spool, together with the shaft B, which is keyed thereto.

An endless rope or cable 25 is attached at one end to the head 10 in line with the piston rod *a* and extends over an idler sheave 26 supported in a bracket 27 suitably located on the frame of the machine. Said cable extends from said idler under and around the spool C, which is located on the engine shaft to one side thereof and in line therewith, and after an appropriate number of turns around said spool passes around an idler sheave 28, supported on a bracket 29, and then under and around the companion spool C an appropriate number of turns, then over idler sheave 30, supported on a bracket 31 adjacent to said sheave, then back to a point behind the connection with the head 10, around another idler sheave 32, supported on a bracket 33 attached to the side of the compressed air cylinder A, and then forward and connected to an arm 34 extending at right angles to the piston rod *a* from the adjacent side of the head 10. Said cable 25 is attached to said arm 34 through the medium of an adjustable bolt 35 provided with nuts 36 and 37 on the respective sides of said arm by which said bolt may be adjusted to regulate the tension of said cable. Bracket 29 carrying the idler sheave 28 is also preferably adjustably mounted for the purpose of taking up slack, or regulating the tension of said cable.

In operation the compressed air or other power used being turned into cylinder A through the pipe 16 by opening a valve, as 38, the piston is driven to the opposite end of the cylinder when strike 12, or 13, as the case may be, will operate valve 14 appropriately and the power be turned into the other end of the cylinder causing the piston to reciprocate, carrying with it the piston rod $a$ and the cable 25. As shown in Fig. 1 the piston has completed its inward stroke and the clutch C at the left in said figure has been locked to shaft B for driving the same. The next stroke of said piston will be outward when the left hand clutch will run loose and the part of the cable attached to the arm 34 will pull, through the medium of the right hand clutch, to rotate shaft B continuing its motion in the same direction as on the other stroke of the piston by the left hand clutch. The power from the driving cylinder is thus communicated to the engine shaft B at both the outward and the inward stroke of the piston and in a manner to rotate shaft B in a uniform direction at each of the said strokes thus imparting a constant and continuous motion to said shaft B instead of driving it intermittently, as in the construction shown in my patent before referred to. The clutches thus operate alternately, but in a uniform direction.

Having thus fully described my said invention what I claim as new and desire to secure by Letters Patent is:

1. An engine starter comprising a compressed air storage cylinder, a reciprocating piston driven thereby, means for controlling the operation thereof, an engine shaft, a pair of clutches mounted on said engine shaft, a piston rod carried by said piston, and an endless cable connected to the piston rod at one end and passing around one of said clutches then over an idler sheave then around the other clutch and then back around another idler sheave behind the point of the inward stroke of the piston then connected to a part carried by said piston rod, substantially as set forth.

2. An engine starter comprising a reciprocating auxiliary engine, means for operating the same, a main engine shaft, a pair of spools mounted on said main engine shaft to run free in one direction, means for coupling them to said engine shaft when operated in the reverse direction, and an endless cable both ends of which are attached to a reciprocating part of said auxiliary engine and the intermediate part of which runs around both of said spools and over intermediate sheaves, whereby said main engine shaft is driven by both strokes of said auxiliary engine, substantially as set forth.

3. An engine starter comprising an auxiliary reciprocating engine, means for driving the same, a main engine shaft, a pair of spools loosely mounted on said engine shaft, clutch mechanism for coupling said spools to said engine shaft when driven in one direction, and an endless cable passing around said spools and over intermediate sheaves and connected at its opposite ends with a reciprocatory part of said auxiliary engine, substantially as set forth.

In witness whereof, I have hereunto set my hand and seal at Philadelphia, Pennsylvania, this 16th day of August, A. D. nineteen hundred and twelve.

GEORGE HARTWELL KELLEY. [L. S.]

Witnesses:
  O. LYTLE,
  M. G. FRAME.